(12) United States Patent
Wu et al.

(10) Patent No.: US 11,538,141 B2
(45) Date of Patent: Dec. 27, 2022

(54) METHOD AND APPARATUS FOR PROCESSING VIDEO

(71) Applicant: BEIJING DAJIA INTERNET INFORMATION TECHNOLOGY CO., LTD., Beijing (CN)

(72) Inventors: Mingda Wu, Beijing (CN); Xin Tao, Beijing (CN); Yucong Chen, Beijing (CN); Fanbo Deng, Beijing (CN); Fulin Li, Beijing (CN); Yurong Dai, Beijing (CN); Bing Yu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/742,466

(22) Filed: May 12, 2022

(65) Prior Publication Data

US 2022/0309623 A1 Sep. 29, 2022

Related U.S. Application Data

(63) Continuation of application No. PCT/CN2021/106339, filed on Jul. 14, 2021.

(30) Foreign Application Priority Data

Oct. 15, 2020 (CN) .......................... 202011104678.6

(51) Int. Cl.
  *G06K 9/00* (2022.01)
  *G06T 5/00* (2006.01)
  (Continued)

(52) U.S. Cl.
  CPC ................ *G06T 5/005* (2013.01); *G06T 7/30* (2017.01); *G06V 20/46* (2022.01)

(58) Field of Classification Search
  CPC ............ G06T 5/005; G06T 7/30; G06V 20/46
  See application file for complete search history.

(56) References Cited

U.S. PATENT DOCUMENTS

2006/0168452 A1 7/2006 Stone
2008/0246777 A1 10/2008 Swanson et al.
(Continued)

FOREIGN PATENT DOCUMENTS

CN 105391952 A 3/2016
CN 105894470 A 8/2016
(Continued)

OTHER PUBLICATIONS

State Intellectual Property Office of China, International Search Report for PCT application PCTCN2021106339 with English translation.

(Continued)

*Primary Examiner* — Dhaval V Patel
(74) *Attorney, Agent, or Firm* — Timothy W. Menasco, Esq.; Harter Secrest & Emery LLP

(57) ABSTRACT

A method and apparatus for processing a video is provided. A current image frame of a video and a mask for a first area are obtained. The Image included in the first area is to be removed from the current image frame. A first resultant image of the current image frame is obtained with an image processing network based on the current image frame and the mask. The first resultant image is an image from which the image included in the first area is removed from the current image frame. A second resultant image of a previous image frame of the current image frame is obtained. The second resultant image is an image from which the image included in the second area is removed from the previous (Continued)

image frame. A final resultant image of the current image frame is obtained by fusing the first resultant image and the second resultant image.

20 Claims, 7 Drawing Sheets

(51) Int. Cl.
*G06T 7/30* (2017.01)
*G06V 20/40* (2022.01)

(56) References Cited

U.S. PATENT DOCUMENTS

| 2020/0160595 | A1* | 5/2020 | Lv | G06T 3/0012 |
|---|---|---|---|---|
| 2021/0056723 | A1* | 2/2021 | Okahara | G06T 5/50 |
| 2021/0125313 | A1* | 4/2021 | Bai | G06V 10/454 |

FOREIGN PATENT DOCUMENTS

| CN | 105898322 A | 8/2016 |
|---|---|---|
| CN | 109214999 A | 1/2019 |
| CN | 110443764 A | 11/2019 |
| CN | 110636373 A | 12/2019 |
| CN | 111145135 A | 5/2020 |
| CN | 111583087 A | 8/2020 |
| CN | 111654747 A | 9/2020 |
| CN | 112233055 A | 1/2021 |

OTHER PUBLICATIONS

The State Intellectual Property Office of People's Republic of China, OA for CN application 202011104678.6 with English translation.
The National Intellectual Property Administration, Notice of Allowance for CN application 202011104678.6 with English translation, dated Aug. 11, 2021.

* cited by examiner

METHOD AND APPARATUS FOR PROCESSING VIDEO

CROSS-REFERENCE TO RELATED APPLICATIONS

This disclosure is a continuation application of International Application No. PCT/CN2021/106339, filed on Jul. 14, 2021, which claims priority to CN Patent Application No. 202011104678.6, filed on Oct. 15, 2020, the contents of which are incorporated herein by reference in their entireties.

TECHNICAL FIELD

The disclosure relates to a field of audio and video technologies, and more particularly, to a method for processing a video and an apparatus for processing a video.

BACKGROUND

In post-processing of a video, accidental occlusions from people or objects during shooting are manually removed.

SUMMARY

According to an embodiment of the disclosure, a method for processing a video is provided. The method includes obtaining a current image frame of a video and a mask for a first area, wherein image included in the first area is to be removed from the current image frame, and obtaining a first resultant image of the current image frame with an image processing network based on the current image frame and the mask, wherein the first resultant image is an image from which the image included in the first area is removed from the current image frame. The method further includes obtaining a second resultant image of a previous image frame of the current image frame, wherein the second resultant image is an image from which the image included in the first area is removed from the previous image frame, and obtaining a final resultant image of the current image frame by fusing the first resultant image and the second resultant image.

According to an embodiment of the disclosure, an electronic device is provided. The electronic device includes at least one processor and at least one memory storing computer-executable instructions. When the computer-executable instructions are executed by the at least one processor, the at least one processor is caused to obtain a current image frame of a video and a mask for a first area, wherein image included in the first area is to be removed from the current image frame, and obtain a first resultant image of the current image frame with an image processing network based on the current image frame and the mask, wherein the first resultant image is an image from which the image included in the first area is removed from the current image frame. Execution of the computer-executable instructions further cause the at least one processor to obtain a second resultant image of a previous image frame of the current image frame, wherein the second resultant image is an image from which the image included in the first area is removed from the previous image frame, and obtain a final resultant image of the current image frame by fusing the first resultant image and the second resultant image.

According to an embodiment of the disclosure, a non-transitory computer-readable storage medium having instructions stored is provided. When the instructions are executed by at least one processor, the at least one processor is caused to obtain a current image frame of a video and a mask for a first area, wherein image included in the first area is to be removed from the current image frame, and obtain a first resultant image of the current image frame with an image processing network based on the current image frame and the mask, wherein the first resultant image is an image from which the image included in the first area is removed from the current image frame. Execution of the instructions further cause the at least one processor to obtain a second resultant image of a previous image frame of the current image frame, wherein the second resultant image is an image from which the image included in the first area is removed from the previous image frame, and obtain a final resultant image of the current image frame by fusing the first resultant image and the second resultant image.

It is understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
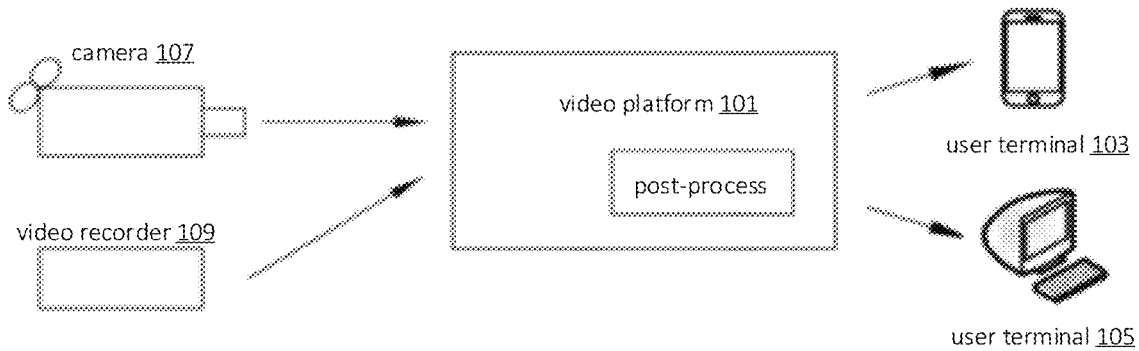
FIG. 1 is a schematic diagram illustrating an implementation scenario of a method for processing a video and an apparatus for processing a video according to an embodiment of the disclosure.

In order to make those skilled in the art well understand the technical solution of the disclosure, the technical solution in the embodiments of the disclosure will be clearly and completely described below with reference to the accompanying drawings.

It should be noted that the terms "first", "second" and the like in the description and claims of the disclosure and the above drawings are used to distinguish similar objects, and are not necessarily used to describe a specific sequence or a precedence sequence. It is to be understood that the data so used may be interchanged under appropriate circumstances, so that the embodiments of the disclosure described herein can be practiced in sequences other than those illustrated or described herein. The implementations described in the following examples are not intended to represent all implementations consistent with this disclosure. Rather, they are merely examples of apparatus and methods consistent with some aspects of the disclosure, as recited in the appended claims.

It should be noted here that "at least one of items" in the disclosure include three parallel cases, "any one of the items", "a combination of several of the items", and "all of the items". As an example, "including at least one of A and B" includes the following three parallel cases: (1) A; (2) B; and (3) both A and B. As another example, "executing at least one of block 1 and block 2" includes the following three parallel cases: (1) executing the block 1; (2) executing the block 2; and (3) executing both the block 1 and the block 2.

In the related art, a video processing method can design an algorithm to perform interpolation on a first area based on pixel values of background around the first area, and determine an interpolation result as content to patch the first area. In terms of processing efficiency, most of these algorithms are based on a central processing unit (CPU). Although the algorithm is relatively simple, it cannot make full use of highly parallelized processors such as graphics processing units (GPUs), such that the speed is limited to a certain extent. In terms of processing effect, since the algorithm is a simple interpolation based on statistical and outline and content of the occlusion are erased, the occlusion can still be clearly observed visually, which provides a mosaic-like effect with poor visual effect.

A method for processing a video based on deep learning can process a video with a deep convolutional neural network. Through a sophisticated and complex network structure, an image is processed using multiple image frames before and after a target image frame as references. As an example, a related method designs a sophisticated and complex network structure that determines the target image frame and 4 image frames before and after the target image frame sampled by a certain interval as input image frames, and determines an image inpainting result of a previous image frame as a reference image frame. The 6 image frames are input to the network simultaneously. An optical flow prediction module is designed between different image frames to align features of different image frames. The aligned features are simply fused to predict a final result. As another example, a related method 2 determines an optical flow between adjacent image frames before and after the target image frame as input, uses an optical flow patching network to patch vacant optical flow of the target image frame, and obtain a final patched image based on forward and backward propagation of a predicted entire optical flow. For content that has not appeared in the video, a single-frame inpainting network can be used to patch the image frame. Since this kind of methods involve processing multiple image frames and calculating multiple optical flows, the overhead is too large, the time cost is high, and the processing speed is slow, which is not suitable for online application scenarios. In addition, this kind of methods also need a mask that is labeled in advance, which cannot automatically perform the recognition.

In order to improve video processing effect while ensuring low algorithm overhead and high speed, the disclosure provides a method for processing a video and an apparatus for processing a video. In detail, in order to fully improve the quality of patched content, a patching algorithm based on a deep convolutional neural network is used to patch the first area that is determined in advance based on a specified outline, to take full use of semantic information of surrounding background. In addition, considering that the single-frame inpainting algorithm will inevitably cause a serious flickering phenomenon in the video, a certain fusion mechanism is designed, which can adaptively make a selection according to a patched result of a current image frame, a patched result of a previous image frame, and a final fusion result of the previous image frame. Therefore, the flickering phenomenon of video can be eliminated by using the previous image frame for fusion without causing a large increase in the overhead. In addition, in order to fuse the patching content with the surrounding background perfectly and naturally, the processed result is processed with the Poisson fusion algorithm, which further improves the processing effect. A method for processing a video and an apparatus for processing a video according to embodiments of the disclosure will be described in detail with reference to FIGS. 1 to 9.

FIG. 1 is a schematic diagram illustrating an implementation scenario of a method for processing a video and an apparatus for processing a video according to an embodiment of the disclosure.

As illustrated in FIG. 1, when a video platform 101 receives a video source, the video platform 101 can post-process the video, and deliver the post-processed video content to each user terminal 103, 105. The post-processing of the video may include removing accidental occlusions caused by people or objects during shooting with a camera 107 or a video recorder 109 (here, the camera is a general term of devices with a shooting function) and removing other parts that are not expected to appear in the video.

Figure 2:
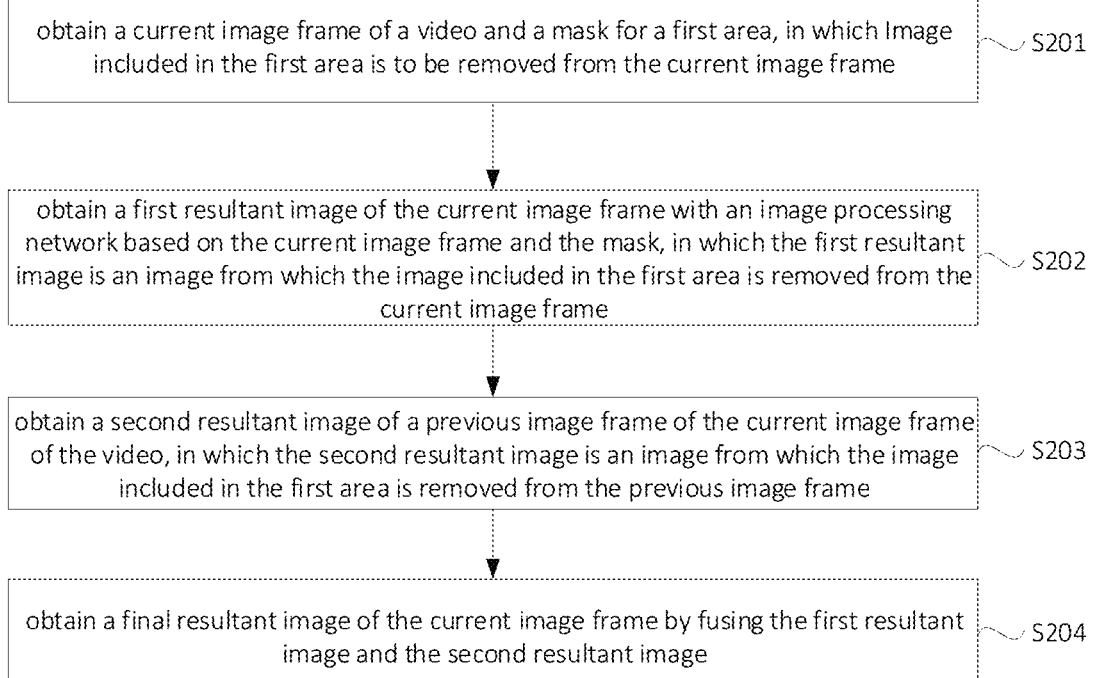
FIG. 2 is a flowchart illustrating a method for processing a video according to an embodiment of the disclosure.

FIG. 2 is a flowchart illustrating a method for processing a video according to an embodiment of the disclosure. The method for processing a video according to an embodiment of the disclosure may be executed by an electronic device having a video processing function.

As illustrated in FIG. 2, in block S201, a current image frame of a video and a mask for a first area may be obtained. The first area corresponds to an area desired to be removed from the current image frame. That is, the image included in the first area is to be removed from the current image frame. Here, the video refers to a video to be processed. For example, the video may be a video captured by a camera obtained from a video platform, a video from other video platforms, or a video obtained on the Internet or locally stored. The method for processing a video according to the embodiment of the disclosure may process each image frame of the video. Thus, the current image frame refers to an image frame that is being processed.

Figure 3:
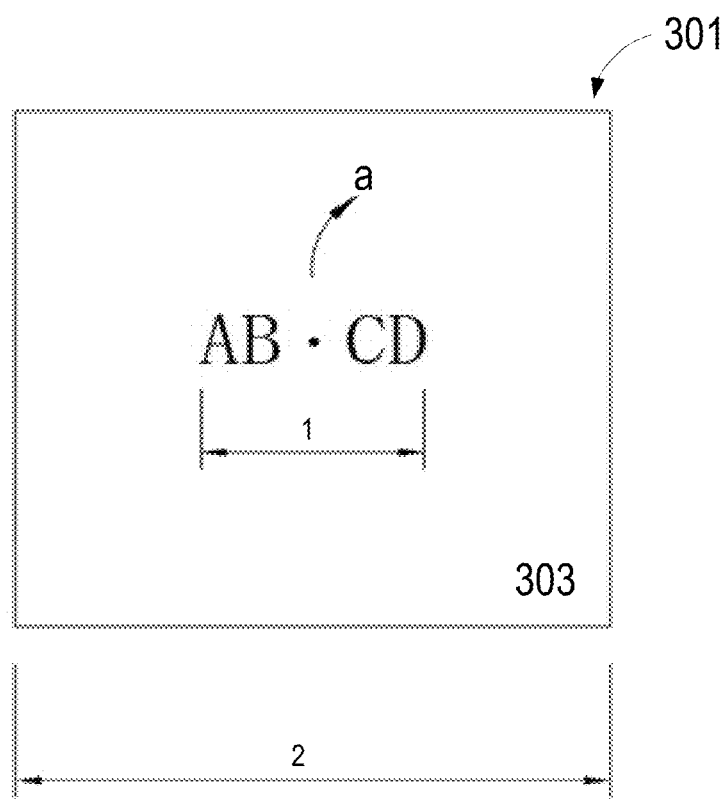
FIG. 3 is a schematic diagram illustrating a first area according to an embodiment of the disclosure.

In addition, the mask for the first area refers to an image mask for blocking other areas of the image of the video to be processed except a predetermined area to be processed. The area to be processed (hereinafter, referred to as the first area) can be larger than an image to be removed, because it is conducive to use semantic information of a surrounding background around the image to be removed to improve the quality of a patched content. For a pattern to be processed, an appropriate first area can be selected as a reference area of the context. In a case where the first area is too large, too much irrelevant information will be introduced, which causes interference to a processing model. In a case where the first area is too small, it is possible that no valid reference information is contained, which affects the processing effect. According to an embodiment of the disclosure, the first area may be a predetermined area including the pattern to be processed, and the predetermined area is a partial area of an image of the video to be processed. For example, the first area may be a specific rectangular area in the image of the video to be processed, and the specific rectangular area takes the center of the pattern to be processed in the image of the video to be processed as a center point and takes twice the length of a longest side of the pattern to be processed as a side length. FIG. 3 is a schematic diagram illustrating a first area 301 according to an embodiment of the disclosure. As illustrated in FIG. 3, given the length of the longest side of the image to be removed (ABCD) is 1, the first area 301 may be a rectangular area 303 centered on the center point "a" of the pattern to be processed and with the side length of 2. Certainly, the first area 301 according to the disclosure is not limited to the above, and can also be any possible first area.

As illustrated in FIG. 2, in block S202, a first resultant image of the current image frame is obtained with an image processing network based on the current image frame and the mask for the first area. The first resultant image is an image from which the image included in the image is removed from the current image frame. Here, the image processing network can be any neural network based on single-frame inpainting (e.g., a deep convolutional neural network). In addition, for a specific scene, the image processing network can be a specifically trained network model.

Figure 4:
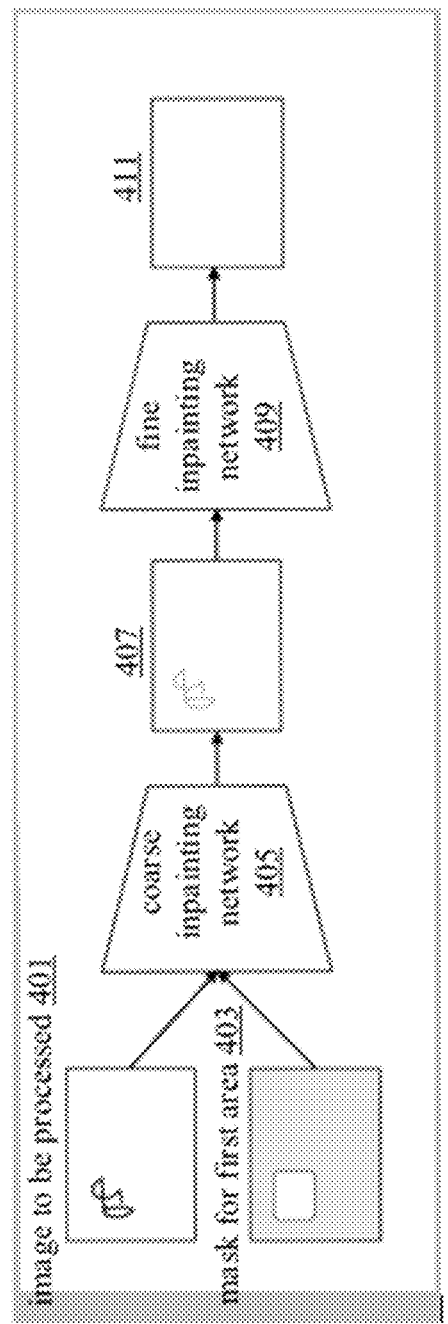
FIG. 4 is a schematic diagram illustrating an image processing process according to an embodiment of the disclosure.

According to an embodiment of the disclosure, coarse-to-fine deep convolutional neural networks can be used to realize rough outline patching in a first state of rough patching and fine details patching in the second stage of fine patching. FIG. 4 is a schematic diagram illustrating an image processing process according to an embodiment of the disclosure. As illustrated in FIG. 4, the image to be processed 401 and the corresponding mask for the first area 403 can be input into a first-stage sub-network (which is called a coarse inpainting network) 405 of the image processing network to output a roughly repaired image 407, and the roughly repaired image is input to a second-stage sub-network of the image processing network (which is called a fine inpainting network) 409, to output a precisely repaired image as the first resultant image 411.

Figure 5:
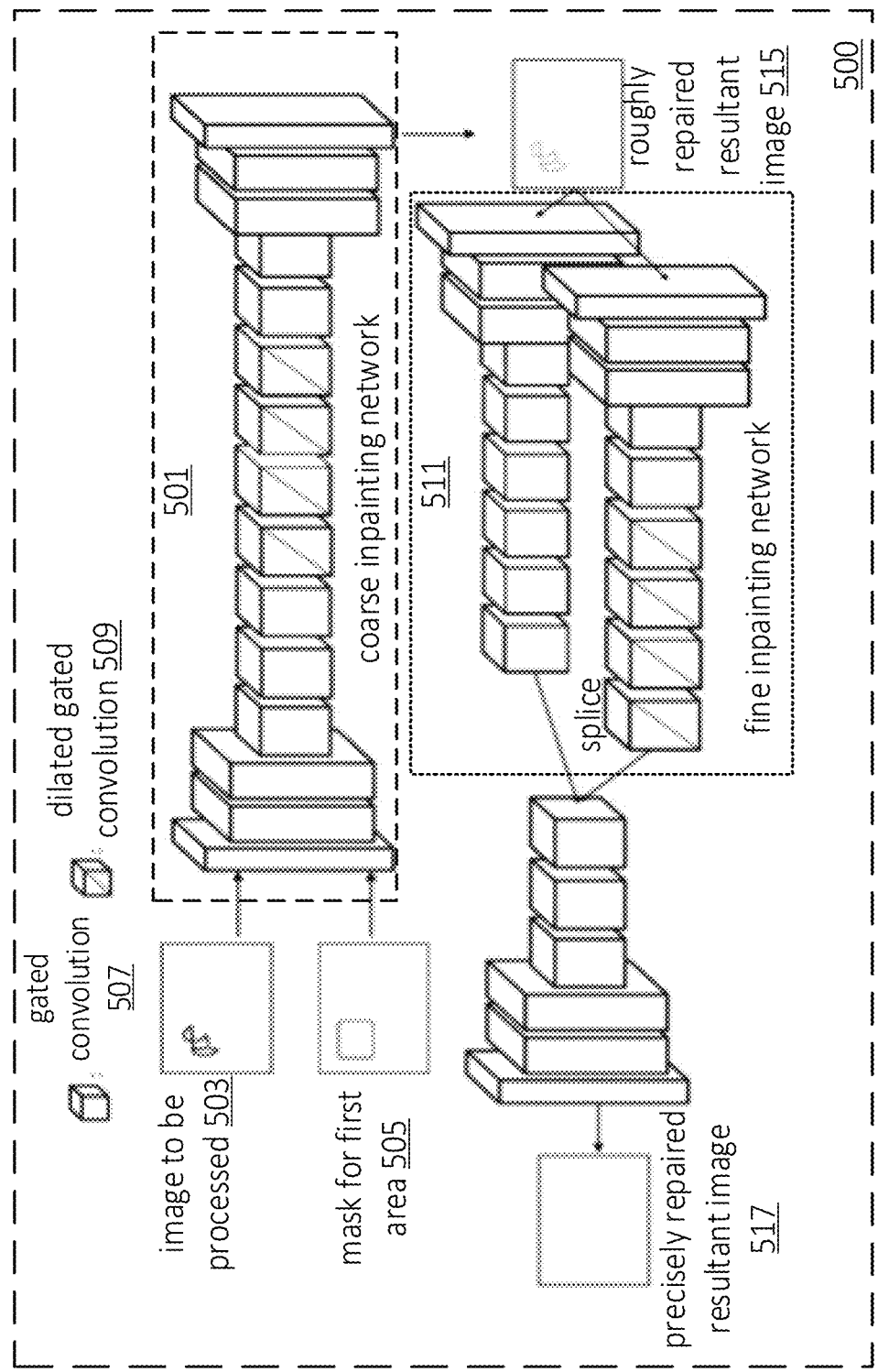
FIG. 5 is a schematic diagram illustrating an image processing network according to an embodiment of the disclosure.

According to embodiments of the disclosure, an encoder-decoder network may be employed to implement the image processing network. FIG. 5 is a schematic diagram illustrating an image processing network 500 according to an embodiment of the disclosure. As illustrated in FIG. 5, the image processing network 500 according to the embodiment of the disclosure is an improved network of the existing image inpainting network. The image processing network according to an embodiment of the disclosure includes two stages. The first stage includes an encoder-decoder network structure 501 for coarse image inpainting, where the input is the image to be processed 503 and the corresponding mask for the first area 505. The network structure 501 of the first stage adopts the combination of gated convolution 507 and dilated gated convolution 509 to obtain the roughly repaired resultant image. The second stage 511 includes an encoder-decoder network structure including two branches for fine image inpainting, in which the input is the roughly repaired resultant image 515 output by the first stage 501. One branch of the second stage 511 of the network structure adopts only the gated convolution, and the other branch adopts the combination of the gated convolution 507 and the dilated gate convolution 509. The output results of the two branches are spliced, and gated convolution 507 is further performed to obtain the precisely repaired resultant image 517.

According to an embodiment of the disclosure, a context-aware module is removed from the second stage of the network structure for model improvement. The context-aware module utilizes global information and generates patching content by making reference to other known areas in the image. However, calculation of the global information causes extra overhead, which will affect the speed of the algorithm. Further, for the speed performance of the processing algorithm, the input is an image subjected from cutting, instead of an original image, and thus context information that can be used for reference is less. In addition, through observation of some cases, forcing to refer to the global information will generate some wrong textures. Therefore, in applying the existing image inpainting network to a field of video image processing, the context-aware module can be removed from the second stage of network structure, to improve the efficiency and effect of image processing.

According to an embodiment of the disclosure, in training the image processing network according to the embodiment of the disclosure, a loss function based on a least square loss of a generative adversarial network is employed. The loss function can be expressed by:

$$\min L(D) = \mathbb{E}_{x \sim p_x}(D(x)-b)^2 + \mathbb{E}_{z \sim p_z}(D(G(z))-a)^2;$$

$$\min L(G) = \mathbb{E}_{z \sim p_z}(D(G(z))-c)^2;$$

where L represents a loss, D represents a discriminator, G represents a generator, x represents a real image (i.e., the reference result), z represents an input of the generator (i.e., a masked image), E represents an expectation, $p_z$ represents a space of inputs of the generator, $p_x$ represents a space of real images (i.e., the entire training set), and a, b, and c are three adjustable parameters, b=c. Since what is minimized is a squared error between the output result and a, b, and c, the loss is called a square loss.

As illustrated in FIG. 2, in block S203, a second resultant image of a previous image frame of the current image frame of the video may be obtained. The second resultant image is an image from which the image included in the first area is removed from the previous image frame. In block S204, a final resultant image of the current image frame is obtained by fusing the first resultant image of the current image frame and the second resultant image of the previous image frame. Using a single-image-based processing algorithm will produce jitter in the time sequence. In order to avoid the jitter, a fusion mechanism based on the current image frame and the previous image frame is adopted to eliminate the jitter and improve the processing effect without increasing the overhead and computing amount.

According to an embodiment of the disclosure, the fusion may be performed using a fusion mechanism based on a time sequence of the optical flow. Due to the first area, the optical flow obtained based on adjacent image frames will have a large deviation. Therefore, an accurate result can be obtained based on the optical flow calculation of the resultant image that has been processed and patched by the image processing network. Therefore, in the case of performing the fusion, the optical flow is calculated based on the resultant images of two adjacent image frames. For example, PWC-Net (i.e., a CNN for optical flow using pyramid, warping, and cost volume) or any other optical flow algorithm can be used as the optical flow extracting network to adjust the speed and accuracy. The aligned images can be obtained by sampling the adjacent image frames based on the optical flow. For example, through the sampling algorithm (grid_sample) included by the pytorch, the optical flow indicates that a pixel propagates from a current image frame to a corresponding position of a next image frame. Pixels in the first area of the resultant image of the current image frame and the first area of the alignment image may be fused to obtain an image including the first area in which the pixels are fused. The fusion mechanism may obtain the pixel value of the corresponding pixel by voting on a plurality of obtained pixel values for corresponding pixels in the first areas of the images to be fused. For example, a statistical value (e.g., mean value, median value, and mode value) of the pixel value of a pixel in the first area of the resultant image of the current frame and the pixel value of a corresponding pixel in the first area of the alignment image can be obtained as the pixel value of the pixel.

Therefore, according to an embodiment of the disclosure, in block S204, the fusion mechanism based on a time sequence of the optical flow may be executed by: calculating the optical flow between the first resultant image of the current image frame and the second resultant image of the previous image frame; obtaining an alignment image of adjacent image frames by sampling based on the optical flow; and fusing pixels in the first area of the first resultant image of the current image frame and the first area of the alignment image of adjacent image frames. For example, for each pixel in the first area, a statistical value of a pixel value of the pixel of the first resultant image of the current image frame and a pixel value of a corresponding pixel of the alignment image of adjacent image frames is determined as a pixel value of the pixel, to obtain the fused image.

According to an embodiment of the disclosure, the second resultant image of the previous image frame utilized by the fusion mechanism may include at least one of a third resultant image of the previous image frame and a fourth resultant image of the previous image frame. The third resultant image of the previous image frame is obtained with the image processing network based on the previous image frame and the mask for the first area. The fourth resultant image of the previous image frame is obtained by fusing the third resultant image of the previous image frame and a fifth resultant image of a further previous image frame of the previous image frame.

According to an embodiment of the disclosure, in the case where the second resultant image of the previous image frame includes both the third resultant image of the previous image frame and the fourth resultant image of the previous image frame, in block S204, a first adjacent optical flow is obtained by calculating an optical flow between the first resultant image of the current image frame and the third resultant image of the previous image frame is calculated. A second adjacent optical flow is obtained by calculating the optical flow between the first resultant image of the current image frame and the fourth resultant image of the previous image frame. A first alignment image of adjacent image frames is obtained by sampling the first resultant image of the current image frame and the third resultant image of the previous image frame based on the first adjacent optical flow. A second alignment image of adjacent image frames is obtained by sampling the first resultant image of the current image frame and the fourth resultant image of the previous image frame based on the second adjacent optical flow. Pixels within the first area of the first resultant image of the current image frame, the first area of the first alignment image of adjacent image frames, and the first area of the second alignment image of adjacent image frames are fused.

Figure 6:
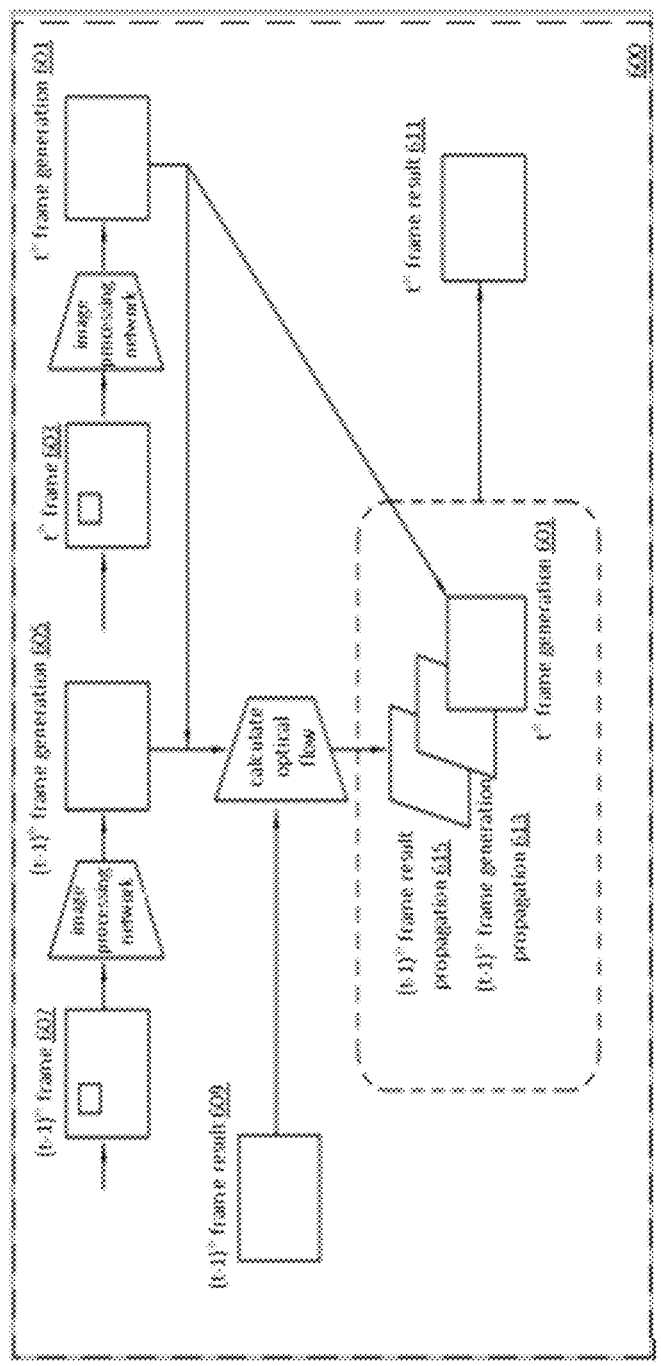
FIG. 6 is a schematic diagram illustrating a fusion mechanism according to an embodiment of the disclosure.

FIG. 6 is a schematic diagram illustrating a fusion mechanism 600 according to an embodiment of the disclosure. As illustrated in FIG. 6, the first resultant image ($t^{th}$ frame generation) 601 of the current image frame ($t^{th}$ frame) 603, the third resultant image (($t-1)^{th}$ frame generation) 605 of the previous image frame (($t-1)^{th}$ frame) 607, the fourth resultant image (($t-1)^{th}$ frame result) 609 of the previous image frame are fused to obtain the final resultant image ($t^{th}$ frame result) 611 of the current image frame. In detail, the optical flow calculation and the sampling are performed on the first resultant image ($t^{th}$ frame generation) 601 of the current image frame ($t^{th}$ frame) 603 and the third resultant image (($t-1)^{th}$ frame generation) 605 of the previous image frame, to obtain the first alignment image (($t-1)^{th}$ frame generation propagation) 613 of adjacent image frames. The optical flow calculation and sampling are performed on the first resultant image ($t^{th}$ frame generation) 601 of the current image frame and the fourth resultant image (($t-1)^{th}$ frame result) 609 of the previous image frame, to obtain the second alignment image (($t-1)^{th}$ frame result propagation) 615 of adjacent image frames. Subsequently, each pixel within the first area of the first resultant image ($t^{th}$ frame generation) 601 of the current image frame, the first alignment image of adjacent image frames (($t-1)^{th}$ frame generation propagation) 613 and the second alignment image of adjacent image frames (($t-1)^{th}$ frame result propagation) 615 are fused. For example, for each pixel within the first area, a median of the pixel value of a corresponding pixel of the first resultant image of the current image frame, the pixel value of a corresponding pixel of the first alignment image of adjacent image frames, and the pixel value of a corresponding pixel of the second alignment image of adjacent image frames is determined as the pixel value of the pixel, to obtain the fused image. That is, the final resultant image of the current image frame can be obtained.

As illustrated in FIG. 2, according to an embodiment of the disclosure, before performing blocks S203 and S204, it may also be determined whether the current image frame is the first image frame of the video to be processed or whether a scene switch occurs between the current image frame and the previous image frame. In a case where the current image frame is the first image frame of the video to be processed, there is no previous image frame, and blocks S203 and S204 are performed. In a case where the scene switch occurs between the current image frame and the previous image frame, the screen will change at these positions. Patching the first area with the information of the previous image frame will cause a negative effect on the processing result such that there is no need to perform blocks S203 and S204. Therefore, in the case where it is determined that the current image frame is the first image frame of the video to be processed or the scene switch occurs between the current image frame and the previous image frame, the blocks S203 and S204 are not performed, and the first resultant image of the current image frame obtained in the block S202 can be determined as the final resultant image of the current image frame.

According to an embodiment of the disclosure, it may be determined whether a scene switch occurs between the current image frame and the previous image frame by automatically detecting a change of the screen. For example, in processing the current image frame, the previous image frame can be obtained, and a difference between the current image frame and the previous image frame is obtained. When the difference exceeds a predetermined threshold, it is determined that scene switch has occurred.

For example, the difference may be a L2-norm distance based on predetermined image blocks. For example, the L2-norm distance between corresponding pixels of two adjacent image frames can be obtained by the following equation:

$$D_{t,t-1}(p) = \sum_{q \in N(p)} [I_t(q) - I_{t-1}(q)]^2$$

where $I_t(q)$ is the $t^{th}$ image frame (for example, the current image frame), $I_{t-1}(q)$ is the $(t-1)^{th}$ image frame (for example, the previous image frame), and P represents a pixel of the current image frame, N(p) is a neighborhood range of p pixel (for example, the neighborhood range with a neighborhood radius of 5), that is, the predetermined image block of the p pixel, q is an indicator to traverse the pixels in the range N(p), which is not limited in the disclosure.

When the L2-norm distance between corresponding pixels of the current image frame and the previous image frame is obtained by the above equation, an average value of the L2-norm distance between pairs of corresponding pixels can be obtained as the difference between the current image frame and the previous image frame. In the case where the obtained difference is greater than a predetermined threshold, it is determined that a scene switch occurs between the current image frame and the previous image frame.

In addition, in actually obtaining the distance between corresponding pixels of adjacent image frames, an integral diagram can also be used to realize the algorithm acceleration, to improve the speed of the algorithm.

Certainly, the method for determining whether a scene switch occurs in the disclosure is not limited to the above method, and any feasible method can also be used to determine whether a scene switch occurs.

According to an embodiment of the disclosure, due to sudden changes in lighting conditions and camera focusing, or blurring caused by movement of the camera and a photographed subject, the adjacent aligned image frames may have a large deviation. Therefore, after the final resultant image of the current image frame is generated in the block S202 or the final resultant image of the current image frame is generated in the block S204 according to the method for processing a video of the disclosure, background fusion is performed on the final resultant image of the current image frame, such that the patched content of the first area of the current image frame can be perfectly and naturally integrated with the background of the current image frame, and the resultant image is harmonious and natural.

For example, the background fusion may be performed with a Poisson fusion algorithm. That is, the sixth resultant image of the current image frame is obtained with the Poisson fusion algorithm based on the current image frame, the final resultant image of the current image frame, and the mask for the first area, as the final resultant image of the current image frame. In detail, the first area in the mask for the first area can be determined as a reference area, and a gradient between a pixel value of the current image frame at a boundary of the reference area and a corresponding pixel value of the final resultant image of the current image frame at the boundary of the reference area is obtained. The pixel value of the final resultant image of the current image frame at the boundary of the reference area can be adjusted until the gradient is minimized. An adjusted final resultant image of the current image frame corresponding to the minimized gradient is determined as the sixth resultant image of the current image frame.

Figure 7:
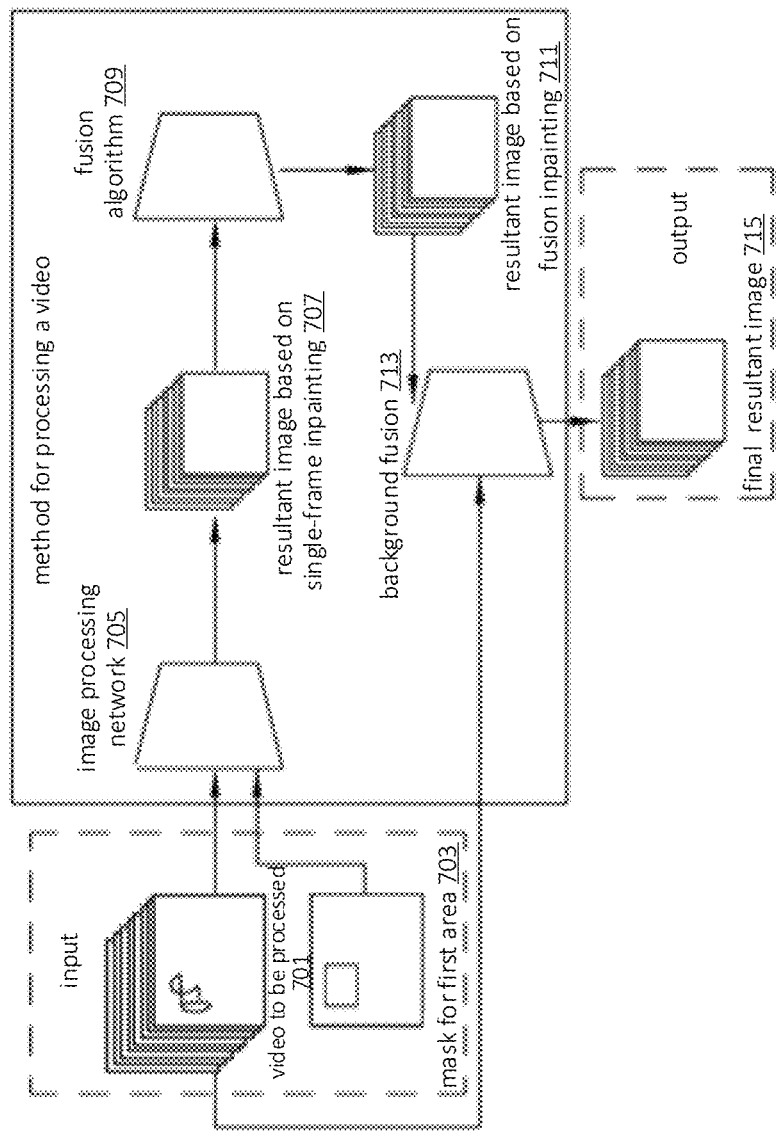
FIG. 7 is a flowchart illustrating a method for processing a video according to an embodiment of the disclosure.

FIG. 7 is a flowchart illustrating a method for processing a video according to an exemplary embodiment of the disclosure.

As illustrated in FIG. 7, the image frame of the video to be processed 701 and the corresponding mask for the first area 703 can be input into a single-image-based image processing network 705, to obtain a resultant image based on single-frame inpainting (for example, the first resultant image) 707. A previous-latter frames fusion algorithm 709 is performed on the resultant image based on single-frame inpainting 707 to obtain a resultant image based on fusion inpainting (for example, the second resultant image) 711. Background fusion 713 is performed on the resultant image 711 based on fusion inpainting, to obtain a resultant image based on background fusion 713 (for example, the sixth resultant image described above), which is output as the final resultant image 715.

Figure 8:
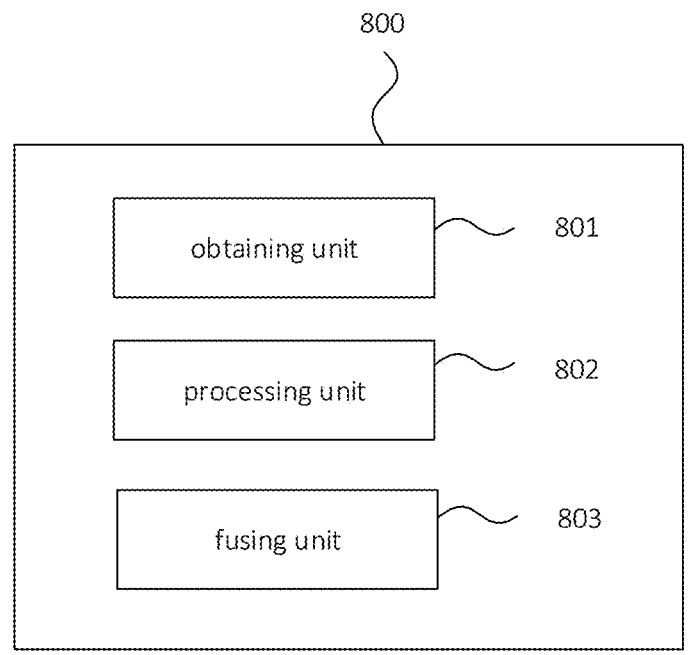
FIG. 8 is a block diagram illustrating an apparatus for processing a video according to an embodiment of the disclosure.

FIG. 8 is a block diagram illustrating an apparatus for processing a video according to an embodiment of the disclosure.

As illustrated in FIG. 8, the apparatus for processing a video 800 according to an embodiment of the disclosure may include an obtaining unit 801, a processing unit 802 and a fusing unit 803.

The obtaining unit 801 is configured to obtain the current image frame and the mask for the first area of the video. Here, the video refers to a video to be processed. For example, the video may be a video captured by a camera obtained from a video platform, a video from other video platforms, or a video from the Internet or locally stored. With the method for processing a video according to an embodiment of the disclosure, each image frame of the video to be processed can be processed. Therefore, the current image frame refers to an image frame that is being processed.

In addition, the mask for the first area refers to an image mask for blocking other areas of the image of the video to be processed except a predetermined area to be processed. The area to be processed (hereinafter, referred to as the first area) can be larger than an image to be removed, because it is conducive to use semantic information of a surrounding background around the image to be removed to improve the quality of a patched content. For a pattern to be processed, an appropriate first area can be selected as a reference area of the context. In a case where the first area is too large, too much irrelevant information will be introduced, which causes interference to a processing model. In a case where the first area is too small, it is possible that no valid reference information is contained, which affects the processing effect. According to an embodiment of the disclosure, the first area may be a predetermined area including the pattern to be processed, and the predetermined area is a partial area of an image of the video to be processed. For example, the first area may be a specific rectangular area in the image of the video to be processed, and the specific rectangular area takes the center of the pattern to be processed in the image of the video to be processed as a center point and takes twice the length of a longest side of the pattern to be processed as a side length. FIG. 3 is a schematic diagram illustrating a first area 301 according to an embodiment of the disclosure. Certainly, the first area 301 according to the disclosure is not limited to the above, and can also be any possible first area. As shown in FIG. 3 within first area 301 is specific rectangular area 303 in the image of the video to be processed.

The processing unit 802 is configured to obtain a first resultant image of the current image frame with an image processing network based on the current image frame and the mask for the first area. Here, the image processing network can be any neural network based on single-frame inpainting (e.g., a deep convolutional neural network). In addition, for a specific scene, the image processing network can be a specifically trained network model.

According to an embodiment of the disclosure, the processing unit 802 may adopt coarse-to-fine deep convolutional neural networks to realize rough outline patching in a first state of rough patching and fine details patching in the second stage of fine patching. As illustrated in FIG. 4, the image to be processed and the corresponding mask for the first area can be input into a first-stage sub-network (which is called a coarse inpainting network) 405 of the image processing network to output a roughly repaired image 407, and the roughly repaired image 407 is input to a second-stage sub-network of the image processing network (which is called a fine inpainting network) 409, to output a precisely repaired image as the first resultant image 411.

According to an embodiment of the disclosure, the processing unit 802 may employ an encoder-decoder network to implement the image processing network, such as the image processing network illustrated in FIG. 5. Furthermore, according to an embodiment of the disclosure, in training the image processing network according to an embodiment of the disclosure, a loss function based on a least square loss of a generative adversarial network is employed. The loss function can be expressed by:

$$\min L(D) = \mathbb{E}_{x \sim p_x}(D(x)-b)^2 + \mathbb{E}_{z \sim p_z}(D(G(z))-a)^2$$

$$\min L(G) = \mathbb{E}_{x \sim p_z}(D(G(z))-c)^2$$

where L represents a loss, D represents a discriminator, G represents a generator, x represents a real image (i.e., the reference result), z represents an input of the generator (i.e., a masked image to be processed), E represents an expectation, $p_z$ represents a space of inputs of the generator, $p_x$ represents a space of real image (i.e., the entire training set), and a, b, and c are three adjustable parameters, b=c. Since what is minimized is a squared error between the output result and a, b, and c, the loss is called a square loss.

The obtaining unit 801 may obtain the second resultant image of the previous image frame of the current image frame of the video. The fusing unit 803 is configured to obtain the second resultant image of the current image frame as the final resultant image of the current image frame by fusing the first resultant image of the current image frame and the second resultant image of the previous image frame. Using the single-image-based processing algorithm will produce jitter in the time sequence. In order to avoid the jitter, a fusion mechanism based on the current image frame and the previous image frame is adopted to eliminate the jitter and improve the processing effect without increasing the overhead and computing amount.

According to an embodiment of the disclosure, the fusing unit 803 is configured to perform the fusion with a fusion mechanism based on a time sequence of the optical flow. For example, the fusing unit 803 is configured to execute the fusion mechanism based on a time sequence of the optical flow may be performed by: calculating the optical flow between the first resultant image of the current image frame and the second resultant image of the previous image frame; obtaining an alignment image of adjacent image frames through sampling based on the optical flow; and fusing pixels within the first area of the first resultant image of the current image frame and the first area of the alignment image of adjacent image frames. For example, the fusing module 803 is configured to for each pixel in the first area, determine a statistical value of a pixel value of the pixel of the first resultant image of the current image frame and a pixel value of a corresponding pixel of the alignment image of adjacent image frames as a pixel value of the pixel, to obtain the fused image.

According to an embodiment of the disclosure, the second resultant image of the previous image frame utilized by the fusion mechanism may include at least one of a third resultant image and a fourth resultant image of the previous image frame. The third resultant image of the previous image frame is obtained with the image processing network based on the previous image frame and the mask for the first area. The fourth resultant image of the previous image frame is obtained by fusing the first resultant image of the previous image frame and the fifth resultant image of the further previous image frame of the previous image frame.

According to an embodiment of the disclosure, in a case where the second resultant image of the previous image frame includes both the third resultant image and the fourth resultant image of the previous image frame, the fusing unit 803 is configured to obtain a first adjacent optical flow by calculating the optical flow between the first resultant image of the current image frame and the third resultant image of the previous image frame, obtain a second adjacent optical flow by calculating the optical flow between the first resultant image of the current image frame and the fourth resultant image of the previous image frame, obtain a first alignment image of adjacent image frames by sampling the first resultant image of the current image frame and the third resultant image of the previous image frame based on the first adjacent optical flow, obtain a second alignment image of adjacent image frames by sampling the first resultant image of the current image frame and the fourth resultant image of the previous image frame based on the second adjacent optical flow, and fuse pixels within the first area of the first resultant image of the current image frame, the first area of the first alignment image of adjacent image frames, and the first area of the second alignment image of adjacent image frames. For example, the fusing unit 803 is configured to for each pixel within the first area, obtain a median of the pixel value of the pixel of the first resultant image of the current image frame, a pixel value of a corresponding pixel of the first alignment image of adjacent image frames, and a pixel value of a corresponding pixel of the second alignment image of adjacent image frames, as the pixel value of the pixel, to obtain the fused image. The fused image is the final resultant image of the current image frame.

According to an embodiment of the disclosure, the apparatus 800 for processing a video according to an embodiment of the disclosure may further include a determining unit (not shown). The determining unit is configured to determine whether the current image frame is a first image frame of the video to be processed or whether a scene switch occurs between the current image frame and the previous image frame. In a case where the current image frame is the first image frame of the video to be processed, there is no previous image frame, and the obtaining unit 801 does not perform the operation of acquiring the second resultant image of the previous image frame, and the fusing unit 803 does not perform any operation. In a case where the scene switch occurs between the current image frame and the previous image frame, the screen will change at these positions. Patching the first are with the information of the previous image frame will cause a negative effect on the processing result, such that the obtaining unit 801 does not obtain the second resultant image of the previous image frame, and the fusing unit 803 also does not perform any operation. Therefore, in the case where the determining unit determines that the current image frame is the first image frame of the video to be processed or the scene switch occurs between the current image frame and the previous image frame, the obtaining unit 801 does not obtain the second resultant image of the previous image frame, the fusing unit 803 does not perform any operation, and the processing unit 802 determines the first resultant image of the current image frame as the final resultant image of the current image frame.

According to an embodiment of the disclosure, the determining unit is configured to determine whether a scene switch occurs between the current image frame and the previous image frame by automatically detecting a change of the screen. For example, in processing the current image frame, the obtaining unit 801 is configured to obtain the previous image frame, and the determining unit is configured to obtain a difference between the current image frame and the previous image frame, and determine that the scene switch occurs based on the difference exceeding a predetermined threshold.

For example, the difference may be a L2-norm distance based on predetermined image blocks. For example, the L2-norm distance between corresponding pixels of two adjacent image frames can be obtained by the following equation:

$$D_{t,t-1}(p) = \sum_{q \in N(p)} [I_t(q) - I_{t-1}(q)]^2$$

where $I_t(q)$ is the $t^{th}$ image frame (for example, the current image frame), $I_{t-1}(q)$ is the $(t-1)^{th}$ image frame (for example, the previous image frame), and p represents a pixel of the current image frame, N(p) is a neighborhood range of p pixel (for example, the neighborhood range with a neighborhood radius of 5), that is, the predetermined image block of the p pixel, q is an indicator to traverse the pixels in the range N(p), which is not limited in the disclosure.

In the case that the L2-norm distance between corresponding pixels of the current image frame and the previous image frame is obtained through the above equation, the determining unit is configured to obtain an average value of the L2-norm distance between pairs of corresponding pixels as the difference between the current image frame and the previous image frame. In a case where the obtained difference is greater than the predetermined threshold, the determining unit is configured to determine that the scene switch occurs between the current image frame and the previous image frame.

In addition, in actually obtaining the distance between corresponding pixels of adjacent image frames, an integral diagram can also be used to realize the algorithm acceleration, to improve the speed of the algorithm.

Certainly, the method for determining whether a scene switch occurs in the disclosure is not limited to the above method, and any feasible method can also be used to determine whether a scene switch occurs.

According to an embodiment of the disclosure, due to sudden changes in lighting conditions and camera focusing, or blurring caused by movement of the camera and a photographed subject, the adjacent aligned image frames may have a large deviation. Therefore, after the processing unit 802 generates the final resultant image of the current image frame or the fusing unit 803 generates the final resultant image of the current image frame, the background fusing unit is configured to perform background fusion on the final resultant image of the current image frame, such that the patched content of the first area of the current image frame can be perfectly and naturally integrated with the background of the current image frame, and the resultant image is harmonious and natural.

For example, the background fusing unit is configured to perform the background fusion with a Poisson fusion algorithm. That is, the sixth resultant image of the current image frame is obtained with the Poisson fusion algorithm based on the current image frame, the final resultant image of the current image frame, and the mask for the first area, as the final resultant image of the current image frame. In detail, the background fusing unit is configured to determine the first area in the mask for the first area as a reference area, obtain a gradient between a pixel value of the current image frame at a boundary of the reference area and a corresponding pixel value of the final resultant image of the current image frame at the boundary of the reference area, adjust the pixel value of the final resultant image of the current image frame at the boundary of the reference area until the gradient is minimized, and determine an adjusted final resultant image of the current image frame corresponding to the minimized gradient as the sixth resultant image of the current image frame.

Figure 9:
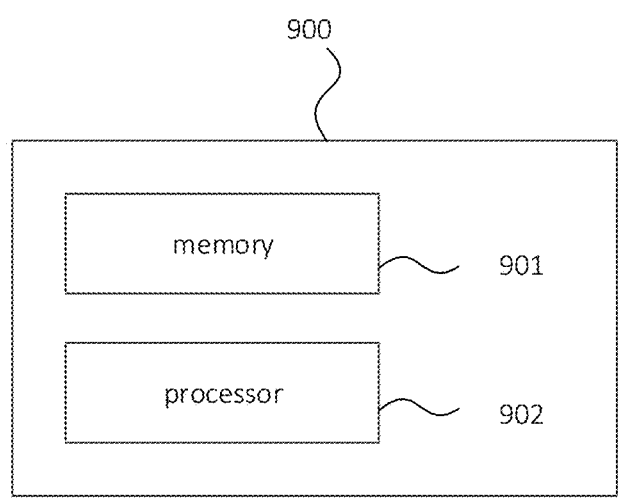
FIG. 9 is a block diagram illustrating an electronic device 900 according to an embodiment of the disclosure.

FIG. 9 is a block diagram illustrating an electronic device 900 according to an exemplary embodiment of the disclosure.

As illustrated in FIG. 9, the electronic device 900 includes at least one memory 901 and at least one processor 902, the at least one memory 901 stores a set of computer-executable instructions, when the set of computer-executable instructions is executed by the at least one processor 902, the method for processing a video according to an exemplary embodiment of the disclosure is implemented.

For example, the electronic device 900 may be a PC computer, a tablet device, a personal digital assistant, a smart phone, or any other device capable of executing the above set of instructions. The electronic device 900 is not necessarily a single electronic device, but can also be a collection of any device or circuit capable of individually or jointly executing the above-mentioned instructions (or the set of instructions). The electronic device 900 may also be part of an integrated control system or system manager, or may be configured as a portable electronic device interconnected through interfaces locally or remotely (e.g., via wireless transmission).

In the electronic device 900, the processor 902 may include a central processing unit (CPU), graphics processing unit (GPU), a programmable logic device, a special purpose processor system, a microcontroller, or a microprocessor. By way of example and not limitation, the processor may also include an analog processor, a digital processor, a microprocessor, a multi-core processor, a processor array and a network processor.

The processor 902 may execute instructions or codes stored in the memory 901, and the memory 901 is configured to store data. Instructions and data may also be sent and received over a network via network interface devices, which may employ any known transmission protocol.

The memory 901 may be integrated with the processor 902. For example, RAM or flash memory may be arranged within an integrated circuit microprocessor or the like. In addition, the memory 901 may include a separate device, such as an external disk drive, a storage array, or any other storage device that may be used by a database system. The memory 901 and the processor 902 may be coupled for operation, or may communicate with each other through I/O ports and network connection, to enable the processor 902 to read files stored in the memory 901.

In addition, the electronic device 900 may also include a video display (such as a liquid crystal display) and a user interaction interface (such as a keyboard, a mouse and a touch input device). All components of the electronic device 900 may be connected to each other via a bus and/or through network.

According to an embodiment of the disclosure, a computer-readable storage medium for storing instructions is provided. When the instructions are executed by at least one processor, the at least one processor is caused to perform the method for processing a video according to the disclosure. For example, the computer-readable storage medium may be a read only memory (ROM), a random access programmable read only memory (PROM), an electrically erasable programmable read only memory (EEPROM), a random access memory (RAM), a dynamic random access memory (DRAM), a static random access memory (SRAM), a flash memory, a non-volatile memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a Blu-ray or optical disc memory, a hard disk drive (HDD), a solid state disk (SSD), a card memory (such as a multimedia card, a secure digital (SD) card, or an extreme digital (XD) card), a magnetic tape, a floppy disk, a magneto-optic data storage device, an optical data storage device, a hard disk, a solid state disk and any other devices. Any other device is configured to store the computer program and any associated data, data files and data structures in a non-transitory manner and to provide the computer program and any associated data, data files and data structures to the processor or a computer, to enable the processor or the computer to execute the computer program. The computer programs in the above computer-readable storage medium can run in an environment deployed in computer devices such as clients, hosts, agent devices and servers. In addition, in an example, the computer programs and any associated data, data files and data structures are distributed over networked computer systems, so that the computer programs and any associated data, data files and data structures are stored, accessed and executed in a distributed manner by one or more processors or computers.

According to an embodiment of the disclosure, a computer program product is provided, in which instructions stored in the computer program product are executable by a processor of a computer device, to implement the method for processing a video according to an embodiment of the disclosure.

With the method for processing a video and the apparatus for processing a video according to embodiments of the disclosure, single-frame processing (i.e., first area patching) can be performed with a neural network, and fusion of adjacent image frames is performed with a specific fusion mechanism considering information of adjacent image frames, to automatically remove occlusions, advertisements and other contents from the video without utilizing information of multiple previous frame and latter frames or multiple calculations of optical flow. While ensuring low algorithm overhead and high speed (for example, the processing speed of 15 frames per second), the quality of the patched content in the first area is improved, such that the patched content is harmonious and natural comparable to the original video content, and the repaired video can make the mark area no longer obvious and indistinguishable from the original video, to achieve the effect of visually ignoring the mark area, thereby improving the user's viewing experience.

With the method for processing a video and the apparatus for processing a video according to embodiments of the disclosure, it is possible to select an appropriate first area for the mark pattern in the video in real time, and make full use of surrounding information to improve the content patching quality of the first area without labeling a mask in advance while there is no overhead increase and interference. There is no limitation of the position of the mark, the shape of the mark, or the type of video, and excellent processing results can be stably output.

With the method for processing a video and the apparatus for processing a video according to embodiments of the disclosure, the background fusion is performed on the processed image with the Poisson fusion algorithm, such that the patched content of the first area can be perfectly and naturally fused with the image background, and the resultant image may be harmonious and natural.

All the embodiments of the disclosure can be implemented independently or in combination with other embodiments, which are all regarded as the protection scope of the disclosure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An method for processing a video, comprising:
obtaining a current image frame of a video and a mask for a first area, wherein image included in the first area is to be removed from the current image frame;
obtaining a first resultant image of the current image frame with an image processing network based on the current image frame and the, wherein the first resultant image is an image from which the image included in the first area is removed from the current image frame;
obtaining a second resultant image of a previous image frame of the current image frame, wherein the second resultant image is an image from which the image included in the first area is removed from the previous image frame; and
obtaining a final resultant image of the current image frame by fusing the first resultant image and the second resultant image;
wherein the second resultant image of the previous image frame comprises a third resultant image of the previous image frame and a fourth resultant image of the previous image frame, the third resultant image is obtained through the image processing network based on the previous image frame and the mask, and the fourth resultant image is obtained by fusing the third resultant image and a resultant result of a further previous image frame of the previous image frame.

2. The method of claim 1, wherein the first area is a specified rectangular area, a center of a pattern contained in the current image frame is determined as a center point of the specified rectangular area, and a length of the specified rectangular area is twice a longest characteristic length of the pattern.

3. The method of claim 1, wherein said fusing the first resultant image and the second resultant image comprises:
obtaining an optical flow between the first resultant image and the second resultant image;

obtaining an alignment image of adjacent image frames by sampling the first resultant image and the second resultant image based on the optical flow; and fusing pixels in the first area of the first resultant image and the first area of the alignment image.

4. The method of claim 3, wherein said fusing pixels in the first area of the first resultant image and the first area of the alignment image comprises:

for each pixel in the first area, determining a pixel value of the pixel based on a statistical value of a pixel value of the pixel of the first resultant image and a pixel value of a corresponding pixel of the alignment image.

5. The method of claim 1, wherein in a case where the second resultant image comprises the third resultant image and the fourth resultant image, said obtaining the optical flow comprises:

obtaining a first adjacent optical flow between the first resultant image and the third resultant image;

obtaining a second adjacent optical flow between the first resultant image and the fourth resultant image;

said obtaining the alignment image comprises:

obtaining a first alignment image of adjacent image frames by sampling the first resultant image and the third resultant image based on the first adjacent optical flow;

obtaining a second alignment image of adjacent image frames by sampling the first resultant image and the fourth resultant image based on the second adjacent optical flow; and said fusing pixels in the first area of the first resultant image and the first area of the alignment image comprises:

fusing pixels in the first area of the first resultant image, the first area of the first alignment image, and the first area of the second alignment image.

6. The method of claim 5, wherein for each pixel in the first area, determining a pixel value of the pixel based on the statistical value of the pixel value of the pixel of the first resultant image and a pixel value of a corresponding pixel of the alignment image comprises:

for each pixel in the first area, determining the pixel value of the pixel based on a median of the pixel value of the pixel of the first resultant image, a pixel value of a corresponding pixel of the first alignment image, and a pixel value of a corresponding pixel of the second alignment image.

7. The method of claim 1, further comprising:

determining the final resultant image based on the first resultant image without obtaining the second resultant image and fusing the first resultant image and the second resultant image, in response to the current image frame being a first image frame of the video or a scene switch occurring between the current image frame and the previous image frame.

8. The method of claim 7, further comprising:

obtaining a L2-norm distance based on image blocks between a pixel of the current image frame and a corresponding pixel of the previous image frame;

determining an average value of the L2-norm distances as a difference between the current image frame and the previous image frame; and determining that the scene switch occurs in response to the difference being greater than a threshold.

9. The method of claim 1, further comprising:

obtaining a sixth resultant image of the current image frame with a Poisson fusion algorithm based on the current image frame, the final resultant image, and the mask; determining the final resultant based on the sixth resultant image.

10. The method of claim 9, wherein said obtaining the sixth resultant image comprises:

obtaining a gradient between a pixel value of the current image frame at a boundary of the first area and a corresponding pixel value of the final resultant image at the boundary of the first area;

adjusting a pixel value of a pixel of the final resultant image at the boundary of the first area until the gradient is minimized; and determining the sixth resultant image based on an adjusted final resultant image corresponding to the minimized gradient.

11. An electronic device, comprising:

at least one processor; and at least one memory storing computer-executable instructions; wherein, when the computer-executable instructions are executed by the at least one processor, the at least one processor is caused to:

obtain a current image frame of a video and a mask for a first area, wherein image included in the first area is to be removed from the current image frame;

obtain a first resultant image of the current image frame with an image processing network based on the current image frame and the mask, wherein the first resultant image is an image from which the image included in the first area is removed from the current image frame;

obtain a second resultant image of a previous image frame of the current image frame, wherein the second resultant image of is an image from which the image included in the first area is removed from the previous image frame; and obtain a final resultant image of the current image frame by fusing the first resultant image and the second resultant image;

wherein the second resultant image of the previous image frame comprises a third resultant image of the previous image frame and a fourth resultant image of the previous image frame, the third resultant image is obtained through the image-processing network based on the previous image frame and the mask, and the fourth resultant image is obtained by fusing the third resultant image and a resultant result of a further previous image frame of the previous image frame.

12. The electronic device of claim 11, wherein the at least one processor is further configured to:

obtain an optical flow between the first resultant image and the second resultant image;

obtain an alignment image of adjacent image frames by sampling the first and the second resultant image based on the optical flow; and fuse pixels in the first area of the first resultant image and the first area of the alignment image.

13. The electronic device of claim 12, wherein the at least one processor is further configured to:

for each pixel in the first area, determine a pixel value of the pixel based on a statistical value of a pixel value of the pixel of the first resultant image and a pixel value of a corresponding pixel of the alignment image.

14. The electronic device of claim 11, wherein in a case where the second resultant image comprises the third resultant image and the fourth resultant image, the at least one processor is configured to:

obtain a first adjacent optical flow between the first resultant image and the third resultant image;

obtain a second adjacent optical flow between the first resultant image and the fourth resultant image;

obtain a first alignment image of adjacent image frames by sampling the first resultant image and the third resultant image based on the first adjacent optical flow;

obtain a second alignment image of adjacent image frames by sampling the first resultant image and the fourth resultant image based on the second adjacent optical flow; and fuse pixels in the first area of the first resultant image, the image removal, the first area of the first alignment image, and the first area of the second alignment image.

15. The electronic device of claim 14, wherein the at least one processor is further configured to:

for each pixel in the first area, determine the pixel value of the pixel based on a median of the pixel value of the pixel of the first resultant image, a pixel value of a corresponding pixel of the first alignment image, and a pixel value of a corresponding pixel of the second alignment image.

16. The electronic device of claim 11, wherein the at least one processor is further configured to:

determine the final resultant image based on the first resultant image without obtaining the second resultant image and fusing the first resultant image and the second resultant image, in response to the current image frame being a first image frame of the video or a scene switch occurring between the current image frame and the previous image frame.

17. The electronic device of claim 16, wherein the at least one processor is further configured to obtain a L2-norm distance based on image blocks between a pixel of the current image frame and a corresponding pixel of the previous image frame;

determine an average value of the L2-norm distances as a difference between the current image frame and the previous image frame; and determine that the scene switch occurs in response to the difference being greater than a threshold.

18. The electronic device of claim 11, wherein the at least one processor is further configured to:

obtain a sixth resultant image of the current image frame with a Poisson fusion algorithm based on the current image frame, the final resultant image, and the mask; and determine the final resultant image based on the sixth resultant image.

19. The electronic device of claim 18, wherein the at least one processor is configured to:

obtain a gradient between a pixel value of the current image frame at a boundary of the first area and a corresponding pixel value of the final resultant image at the boundary of the first area;

adjust a pixel value of a pixel of the final resultant image at the boundary of the first area until the gradient is minimized; and determine the sixth resultant image based on an adjusted final resultant image corresponding to the minimized gradient.

20. A non-transitory computer-readable storage medium, having instructions stored, wherein when the instructions are executed by at least one processor, the at least one processor is caused to:

obtain a current image frame of a video and a mask for a first area, wherein image included in the first area is to be removed from the current image frame;

obtain a first resultant image of the current image frame with an image processing network based on the current image frame and the mask, wherein the first resultant image;

is an image from which the image included in the first area is removed from the current image frame;

obtain a second resultant image of a previous image frame of the current image frame, wherein the second resultant image is an image from which the image included in the first area is removed from the previous image frame; and obtain a final resultant image of the current image frame by fusing the first resultant image.

* * * * *